United States Patent [19]

Cartner

[11] 4,442,658

[45] Apr. 17, 1984

[54] TRAILING WING MOWER

[76] Inventor: Jack O. Cartner, 1005 N. Eighth St., Cambridge, Ohio 43725

[21] Appl. No.: 377,347

[22] Filed: May 12, 1982

[51] Int. Cl.³ .............................................. A01D 69/00
[52] U.S. Cl. .......................................... 56/11.9; 56/6
[58] Field of Search ................... 56/6, 11.9, 13.6, 15.2, 56/15.9; 165/53, 55, 56, 128, 129; 60/912

[56] References Cited

U.S. PATENT DOCUMENTS

| | | | |
|---|---|---|---|
| 2,920,434 | 1/1960 | Ingram | 56/25.4 |
| 2,952,961 | 9/1960 | Engler | 56/13.6 |
| 3,045,413 | 7/1962 | Sheffer | 56/6 |
| 3,398,786 | 8/1968 | McNabney | 165/55 |
| 3,400,521 | 9/1968 | Caldwell | 56/13.6 |
| 3,527,032 | 9/1970 | Wood | 56/6 |
| 3,699,847 | 10/1972 | Little | 91/411 |
| 3,729,910 | 5/1973 | Hardee | 56/11.9 |
| 3,751,191 | 7/1973 | Mott, Jr. | 417/313 |
| 4,048,789 | 9/1977 | Cartner | 56/11.9 |
| 4,048,790 | 9/1977 | Zweegers | 56/13.6 |
| 4,183,195 | 1/1980 | James | 56/11.9 |
| 4,308,713 | 1/1982 | James | 56/11.9 |

OTHER PUBLICATIONS

Terrain King Advertisement of The Hydro-15, published unknown.
Terrain King Advertisement of Versa Mower, published unknown.
Terrain King Advertisement of The TK-15, published unknown.

Primary Examiner—Gene Mancene
Assistant Examiner—David L. Tarnoff
Attorney, Agent, or Firm—Fay & Sharpe

[57] ABSTRACT

The trailing wing mower includes a first or central section (A) to which a second or wing section (B) is pivotally connected and a third section (C) is pivotally connected. The first section includes a plurality of tubular members (12, 14, 16, 18, 20 and 22) which are structurally and fluidically interconnected to function as a supporting frame and as a heat exchanger. A hydraulic fluid pump (122) pumps hydraulic fluid from a reservoir (120) to hydraulic motors (50, 90, 90') which are disposed on the first, second and third sections. Hydraulic fluid from the motors flows through the plurality of tubular members to be cooled and returns to the reservoir. The second and third sections are angularly positionable about the first section. The angular position is controlled by a fluid cylinder (100). A cylinder link (106) is pivotally connected with the first section and with the fluid cylinder. A wing link (114) is pivotally connected with the second section and the cylinder link such that elongation or contraction of the fluid cylinder pivots the second section to adjust its angular position.

14 Claims, 5 Drawing Figures

TRAILING WING MOWER

BACKGROUND OF THE INVENTION

This application pertains to the art of mowing machines for grass and brush. More particularly, the invention relates to wide sweep or wing mowers which are designed to be towed by tractors or other vehicles. The invention finds particular application in mowers for maintaining the grass medians of highways and will be described with particular reference thereto. It is to be appreciated, however, that the invention has broader applications including machines for maintaining and reclaiming large expanses of grasses, weeds, light brush, and trees up to about a 5 inch diameter.

Numerous tractor towed mowing devices or trailing mowers are known in the art, note for example U.S. Pat. No. 2,952,961, issued September, 1960 to J. F. Engler, U.S. Pat. No. 3,400,521, issued September, 1968 to Caldwell, U.S. Pat. No. 3,527,032, issued September, 1970 to Wood. These prior art trailing mowers included a central mowing assembly which was supported by wheels toward the rear and adapted to be connected with the tractor at the front. A first and a second side or wing mowing assembly was hingedly connected to either side of a mowing central assembly. The hinged interconnection permitted the wing assemblies to be folded vertically to reduce the width of the towed mower and facilitate its transportation. The central and side assemblies each included a cutting blade which was connected by a mechanical gear train with a power take off of the tractor.

Others have suggested replacing the mechanical drive of trailing mowers with a hydraulic drive system, note for example U.S. Pat. No. 3,729,910, issued May, 1973 to Hardee and U.S. Pat. No. 4,308,713, issued January, 1982 to James. With the use of hydraulic drive systems, came the need for cooling the hydraulic fluid to inhibit high temperature hydraulic fluid breakdown. One solution was to use a sufficiently large reservoir, that the hydraulic fluid remained relatively cool. Another solution was to install a heat exchanger on the tractor, reservoir, or mower. One such heat exchanger has been on sale and in public use since 1976 by the Triumph Machinery Company of Hackettstown, New Jersey. In the Triumph heat exchanger, the upper deck of the mower adjacent the cutting blade served as the base of the heat exchanger. A generally U-shaped channel and end plates were welded to the upper deck to define a relatively flat, elongated heat exchanger through which the hydraulic fluid was channelled. In principle, the updraft created by the rotatory motion of the cutting blades would circulate cooling air against the deck and heat exchanger. Another mower in which the deck functioned as the lower wall of the heat exchanger is illustrated in the above referenced James patent.

One of the problems encountered in utilizing the upper deck as a wall of the heat exchanger is that wet grass forms a mat or cake between the deck and the cutting blades. Because grass and brush hold moisture and dew, the cuttings are frequently damp. The damp cuttings form a fiberous mat on the underside of the deck which functions like fiberglass or glass wool insulation. This mat is effective insulation which inhibits the hydraulic fluid from dissipating heat through the deck. Further, constructing the heat exchanger integrally with the deck inhibits air circulation around the heat exchanger and completely blocks air circulation between the deck and the heat exchanger.

The present invention contemplates a new and improved trailing mower which has an improved heat exchanger design and an improved side wing lifting mechanism that overcomes the above referenced problems and others.

SUMMARY OF THE INVENTION

In accordance with the present invention, there is provided a trailing wing mower which comprises a first rotary mower section, at least a second or wing section, and a hydraulic system. The first section includes a combined tubular frame and hydraulic fluid heat exchanger, a shield plate or deck, a plurality of spacers connecting the deck below and spaced from the combined frame and heat exchanger such that the passage of air between the heat exchanger and the deck is substantially uninhibited. A hydraulic motor which is mounted above the deck is drivingly connected with a cutting blade mounted below the deck. At least one wheel supports at least one end of the combined frame and heat exchanger. The wing section includes a wing deck, a hydraulic motor mounted above the wing deck, and a cutting blade disposed below the wing deck drivingly connected wth the wing hydraulic motor. The hydraulic system includes a pump which is operatively connected with the heat exchanger for receiving cooled hydraulic fluid therefrom and with the hydraulic motors for pumping hydraulic fluid thereto. A hydraulic fluid return line means extends from the hydraulic motors to the heat exchanger for returning fluid from the hydraulic motors to the heat exchanger.

In accordance with another aspect of the invention, there is provided a trailing wing mower which includes a central rotary mower section, at least one wing rotary mower section, a hinge means for hingedly connecting the central section and the wing section, and a wing angular position controlling assembly for controlling the angular position of the wing section relative to the central section. The wing position controlling assembly includes a fluid cylinder operatively connected with one of the central and wing sections, a cylinder link pivotally connected adjacent one end with said one of the central and wing sections and pivotally connected with the cylinder to be pivotally moved thereby, a wing link connected with the other one of the central and wing sections and pivotally connected with the cylinder link, and a cylinder control means for selectively controlling the fluid cylinder.

BRIEF DESCRIPTION OF THE FIGURES

The invention may take form in various parts and arrangements of parts. The drawings are only for purposes of illustrating a preferred embodiment and are not to be construed as limiting the invention.

FIG. 3 is a sectional view through section 3—3 of FIG. 1;

DETAILED DESCRIPTION OF THE PREFERRED EMBODIMENT

Figure 1:
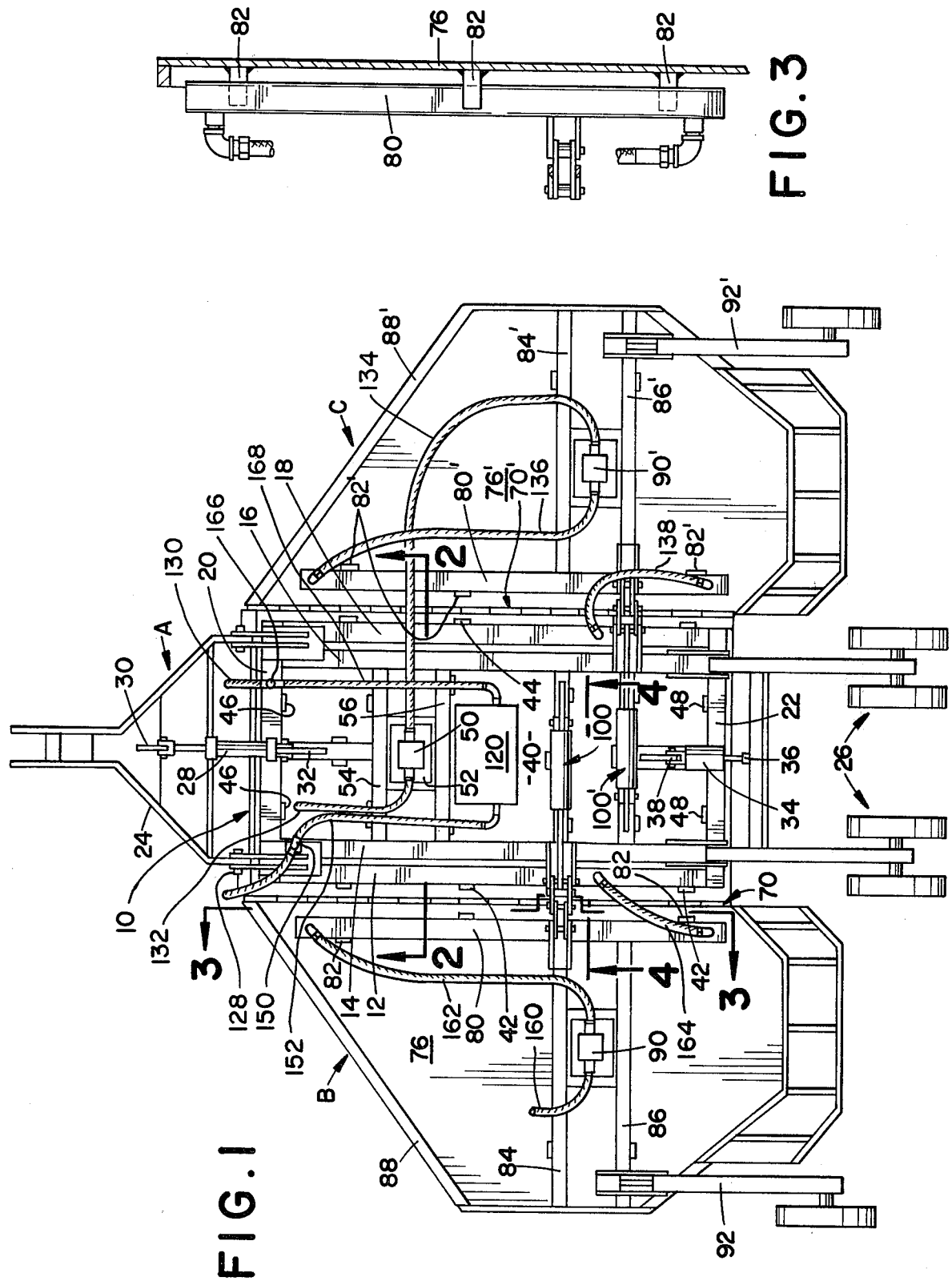
FIG. 1 is a top plan view of a trailing wing mower in accordance with the present invention.

With particular reference to FIG. 1 a multi-section trailing wing mower includes a first or central rotary mower section A to which a second or wing rotary mower section B is pivotally connected at one side and to which a third or wing rotary section C is connected along an opposite side. The multi-section mower is intended to be trailed behind a tractor or other prime mower for cutting grass and brush to a selected height.

The central section A includes a tubular assembly 10 which functions as a frame providing structural strength to the central section and heat exchanger for cooling hydraulic fluid. The tubular assembly includes a first side pair of tubular channel members 12 and 14, a second side pair of tubular channel members 16 and 18, a front tubular channel member 20, and a rear tubular channel member 22. A front end supporting means, particularly a trailer hitch 24, is connected with the front and side tubular channel members. A rear end supporting means, particularly a wheel assembly 26, is connected with the rear and side tubular members for movably supporting the rear of the central section. A front end ground clearance adjusting means, particularly a fluid cylinder 28, interconnected between a hitch bracket 30 and a central section bracket 32, adjusts the altitude of the front of the central section above the ground by adjusting the angle between the trailer hitch and the central section. A rear end ground clearance adjusting means, particularly a fluid cylinder 34, interconnected between a wheel assembly bracket 36 and a central section bracket 38, adjusts the altitude of the rear end of the central section above the ground. By operating the front and rear ground clearance ajusting means, the altitude and orientation of the central section relative to the ground is selectively adjustable.

A plurality of spacing means support the tubular assembly 10 in a fixed, spaced relationship with a deck 40. Specifically, a first plurality of spacing brackets 42 are welded to the deck and the first pair of tubular members 12 and 14; a second plurality of spacing brackets 44 are welded to the deck and the second pair of tubular members 16 and 18; a third plurality of spacing brackets 46 are welded to the deck and the front tubular member 20; and a fourth plurality of spacing brackets 48 are welded to the deck and the rear tubular member 22. Additional spacing brackets are welded to the deck and nonhydraulic fluid carrying support members which are structurally connected with the combined frame and heat exchanger. The spacing between the deck and the tubular assembly is sufficiently large that air flow therebetween is facilitated yet sufficiently small that a structural supportive intersection therebetween is provided. In the preferred embodiment, the spacing is about a half inch.

The deck 40 is of sufficiently heavy gauge to shield the operator and parts of the central section from mown grass, brush, rocks, and the like. The number of spacing brackets can be decreased with a heavier gauge deck and increased with a lighter gauge deck.

Figure 2:
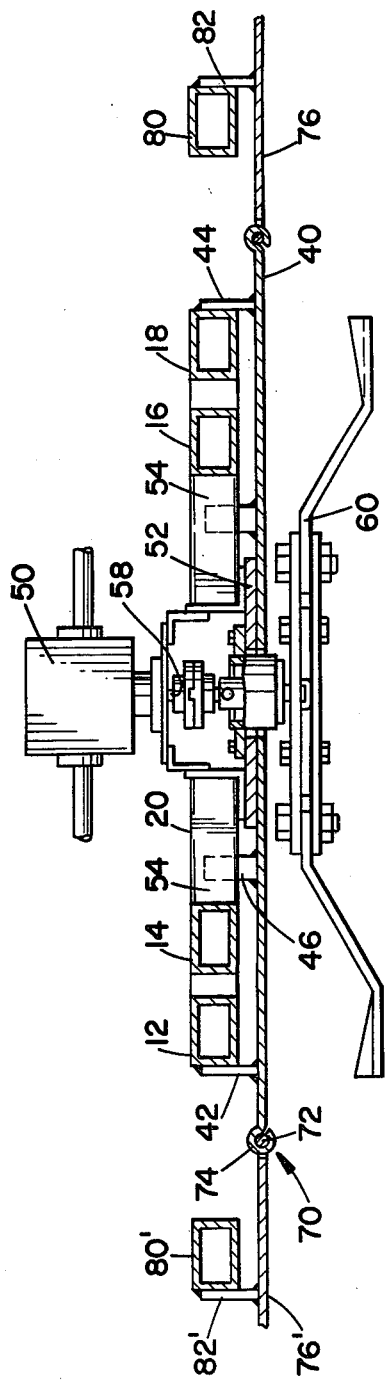
FIG. 2 is a sectional view through section 2—2 of FIG. 1.

With continuing reference to FIG. 1 and particular reference to FIG. 2, a first hydraulic motor 50 is mounted on a motor support plate 52 which extends between motor support members 54 and 56. In the preferred embodiment, the motor support members are structurally but not fluidically connected with the side tubular members 14 and 16. The hydraulic motor 50 rotates a motor shaft 58 which extends to an aperture in the deck. A first or central section cutting blade 60 is connected with the motor shaft below the deck to be driven by the hydraulic motor.

The second or left wing section B is substantially the same as the third or right wing section C. For simplicity of illustration and to emphasize the similarity, elements of the third section are denoted by the same reference numeral as like elements of the second section but followed by a prime ('). The following description of the wing section is to be understood as describing both the left and right wing sections.

With continual reference to FIGS. 1 and 2, a hinge means 70 connects the wing section with the first or central section A. The hinge means includes a plurality of hinge pins 72 which are connected with the central section deck 40 and a plurality of at least partially surrounding hinge portions 74 which are integrally connected with a wing section deck 76.

The wing section includes a wing tubular member 80 which functions both as a structural framing or support member and as a heat exchanger. A plurality of wing spacing brackets 82 mount the wing tubular member 80 in a fixed, spaced relationship with the wing deck 76. A pair of nonfluid carrying wing motor support members 84 and 86 extend from the tubular member 80 to an upstanding peripheral edge portion 88. A wing hydraulic motor 90 is mounted between the wing motor supports 84 and 86. Like the first hydraulic motor, the wing hydraulic motor 90 is drivingly connected with a rotary cutting blade disposed below the wing deck. A wing support wheel assembly 92 provides support to assist in maintaining the wing section with a preselected ground clearance.

Figure 4:
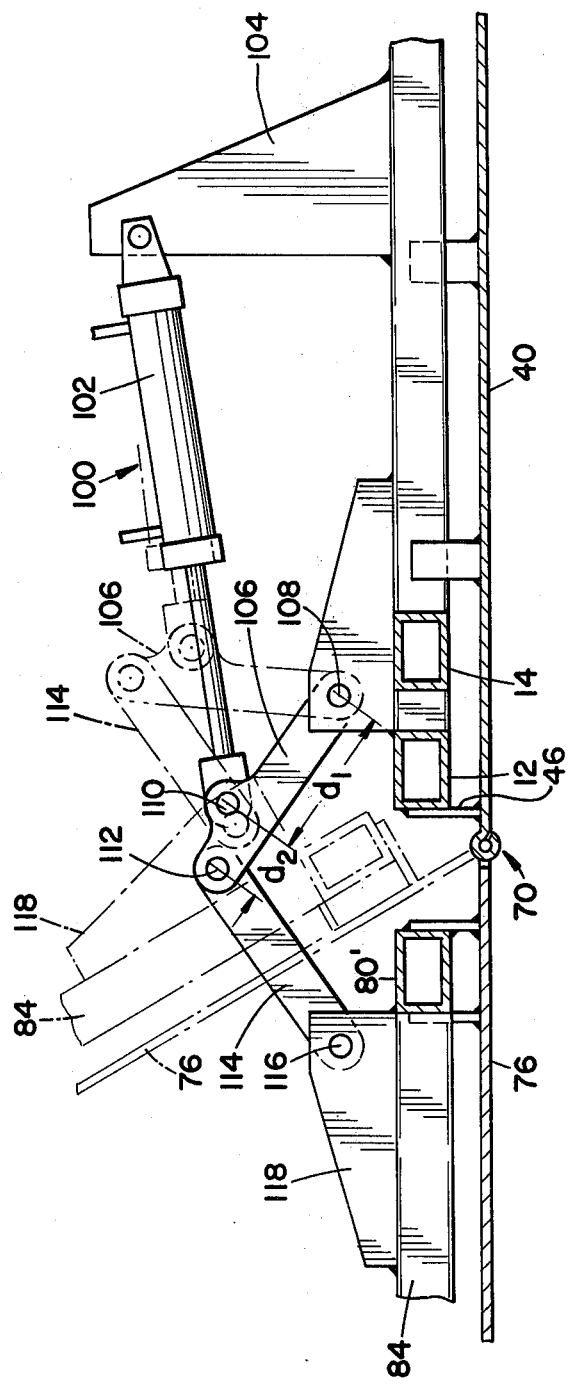
FIG. 4 is a sectional view through section 4—4 of FIG. 1 illustrating a wing angular position controlling assembly; and, FIG. 5 is a diagrammatic view of a hydraulic system of the trailing wing mower of FIG. 1.

With particular reference to FIG. 4 and continued reference to FIG. 1, the angular position of the wings is controllable such that the wings can be folded vertical for easier transport and at various angles relative to the central section to facilitate mowing on rolling terrain. Again, the elements for controlling the angular orientation of the right wing which are the same as the elements for controlling the angular orientation of the left wing are denoted by the same reference numeral but followed by a prime ('). A wing angular position controlling means 100 controls the angular position of the wing sectionq relative to the central section. The wing angular position controlling means includes a hydraulic cylinder 102 which is connected with an upstanding support 104 that in turn is connected with the frame structure of the central section. A cylinder link 106 is pivotally connected adjacent one end by a pivot means 108 with the central section tubular assembly, particularly tubular members 12 and 14. The hydraulic cylinder is pivotally connected by a pivot 110 with an intermediate portion of the cylinder link. The other end of the cylinder link is connected by a pivot means 112 with a wing link 114. The wing link 114 is pivotally connected by a pivot means 116 with a flange 118 which, in turn, is connected with the wing frame member 84. A distance $d_1$ between the pivot 108 and the pivot 110 relative to a distance $d_2$ between the pivot 110 and pivot 112 determine the mechanical advantage which the cylinder has. The greater the length of $d_1$ and the shorter the length of $d_2$, the greater the mechanical advantage enjoyed by the hydraulic cylinder. Analogously, by decreasing the distance $d_1$, the mechanical advantage of the cylinder is decreased but so too is the length of travel over which it must move for a corresponding change in the angular position of the wing assembly. By shortening $d_1$, a hydraulic cylinder with a relatively short travel can be used to produce a wide range of angular positions of the wing assembly.

Figure 5:
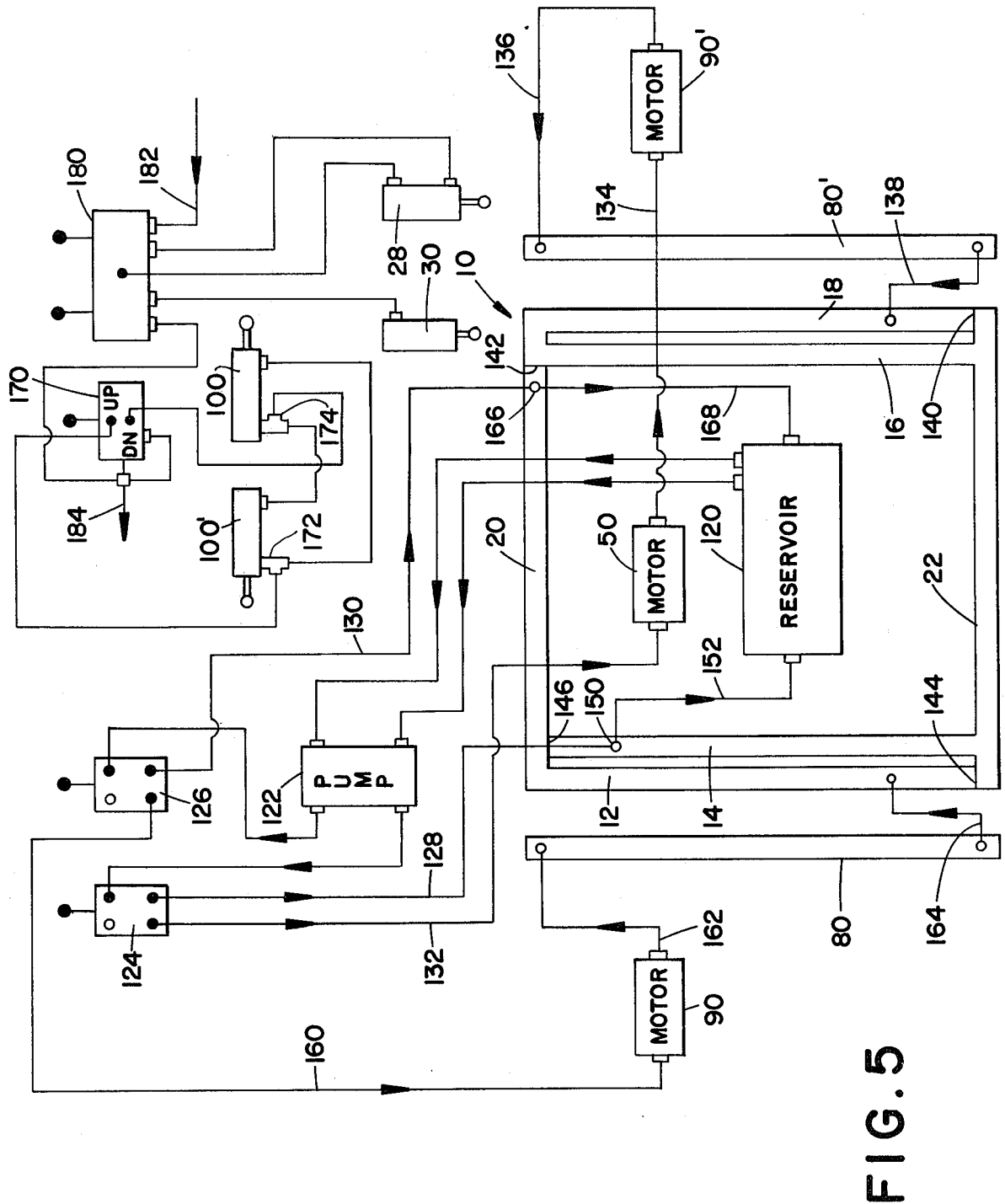

With particular reference to FIG. 5 and continuing reference to FIG. 1, the hydraulic system includes a reservoir 120 which receives cooled hydraulic fluid from the heat exchanger 10, a dual chamber circulating pump 122 is mounted on the tractor adjacent its power take off to be driven thereby. The circulating pump pumps hydraulic fluid from the reservoir 120 to a first control valve 124 and a second control valve 126. The control valves include manual operating levers mounted on the tractor adjacent the operator for controlling the flow rate of the hydraulic fluid pumped therethrough. Each control valve has a recirculating port for returning excess hydraulic fluid back to the reservoir via return lines 128 and 130. A first hydraulic pressure output line 132 is connected with the first hydraulic motor 50 to propel it with the hydraulic fluid. A flexible connector hose 134 connects the right wing hydraulic motor 90' in series with the central hydraulic motor 50. A flexible return line 136 connects the right wing hydraulic motor with the right wing heat exchanger tubular member 80'. A flexible connector 138 connects the other end of the wing heat exchanger with one end of one of the pair of side tubular members 16 and 18, in the preferred embodiment tubular member 18, adjacent one end thereof. A barrier 140 adjacent the connection between tubular member 18 and the flexible connector 138 separates the interior flow paths of side tubular member 18 and bottom tubular member 22. This causes the hot hydraulic fluid to flow the length of the side tubular member 18 toward the front tubular member 20. However, a front barrier 142 causes the hydraulic fluid to return through the side tubular member 16 to the bottom tubular member 22. Another barrier 144 channels the fluid from the bottom tubular member through the side tubular member 14. Yet another barrier 146 marks the end of the tortuous path defined by the tubular members for hydraulic fluid to flow from the central and first wing motors. A tee connection 150 adjacent the closed end of the tubular member 14 is connected with the first valve return line 128 and a flexible connector 152 which leads to the reservoir 120. In this manner, the previously cooled, recirculated hydraulic fluid and the hydraulic fluid which has just passed through the heat exchanger are mixed at the tee connection and returned to the reservoir.

Pressurized hydraulic fluid from the second control valve 126 is connected by a flexible connector 160 with the left wing motor 90. A flexible connector 162 conveys the hydraulic fluid from the left wing motor to the left wing heat exchange tubular member 80. A flexible connector 164 connects the other end of the left wing heat exchanger with one end of the tubular member 12. The barriers 144, 146, and 142 confine the fluid received in the side tubular member 12 to flow therethrough and through the front tubular member 20. In this manner, the hydraulic fluid which has been used to propel a single motor is conveyed through two longitudinally extending members 80' and 12; whereas, the fluid which was used to propel two of the fluid hydraulic motors is conveyed through four of the longitudinal tubular members 80', 18, 16, and 14. A tee connector 166 connects the return line 130 of the second control valve and the cooled fluid at the end of the tubular member 20 with a reservoir return line 168. In the preferred embodiment, the heat exchanger has a fluid capacity of about 35 gallons and the reservoir has a fluid capacity of about 50 gallons. Optionally, the heat exchanger may be increased in size and the reservoir decreased or even eliminated. Alternately, under lighter mowing loads such as grasses, the hydraulic fluid can be conveyed directly from the wing motors to the central heat exchanger 10 bypassing the wing heat exchangers 80 and 80'.

The hydraulic system further includes tractor mounted controls for controlling the position of the hydraulic cylinders 28, 34 100 and 100', i.e. for controlling the height and orientation of the central section and for raising and lowering the wing sections. A wing angular position control valve 170 selectively provides hydraulic fluid under pressure via a first tee connector 172 to the piston contracting inputs of cylinders 100' and 100 to raise the wings and receives hydraulic fluid via a second tee connector 174 to the hydraulic cylinders to lower the wings. A ground clearance controller 180 receives hydraulic fluid under pressure from the tractor via an inlet line 182. The controller selectively supplies fluid to the central section front end ground clearance adjusting cylinder 28 and the central section real end ground clearance adjusting cylinder 34 to raise and lower the front and rear of the section respectively. Because the weight of the central section and the connected wing sections urges the rear cylinder toward its lowest altitude position, the hydraulic fluid need only be used to raise the rear of the central section while gravity is used to lower it. The front end ground clearance adjusting cylinder is hydraulically controllable in both directions to facilitate connection of the trailer hitch 24 with the tractor. The ground clearance controller 180 further supplies hydraulic fluid to the wing angular position control valve 170 and to a return line 184 which returns hydraulic fluid to the pump and reservoir.

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalents thereof.

Having thus described a preferred structure embodying the invention, the invention is now claimed to be:

1. A trailing wing mower comprising:
   a. a central rotary mower section including:
      (i) a central section deck;
      (ii) a combined frame and heat exchanger including at least first and second side tubular channel members disposed adjacent opposite sides of the central section deck, front and rear tubular channel members disposed adjacent the front and rear of the central section deck, the first side, the second side, the front, and the rear tubular channel members being structurally and fluidically interconnected;
      (iii) barrier means disposed in said tubular channel members for defining at least a first and a second path through the tubular channel members, the first path being longer than the second path, whereby the first path has a greater heat exchange capacity than the second path;
      (iv) spacing means for fixedly connecting the central section deck to, below and spaced from the tubular members and thereby forming a structural supportive intersection between said deck and said tubular members such that the passage of air between the tubular members and the central section deck is substantially uninhibited, whereby cooling air is able to flow around the tubular members to facilitate the exchange of heat;
  (v) a first hydraulic motor mounted adjacent the central section deck;
  (vi) a cutting blade mounted below the central section deck and operatively connected with the first hydraulic motor to be driven thereby;
  (vii) support means for supporting the central section for movement along the ground;
b. a wing rotary mower section pivotally mounted to the central section and including:
  (i) a first wing deck;
  (ii) a second hydraulic motor mounted adjacent the wing deck;
  (iii) a second cutting blade mounted below the first wing deck and operatively connected with the second hydraulic motor to be driven thereby; and,
c. a hydraulic system including;
  (i) pump means operatively connected with the first and second hydraulic motors and with the tubular members for pumping hydraulic fluid to the hydraulic motors;
  (ii) return line means for returning hydraulic fluid from the hydraulic motors to the first and second paths of the tubular members.

2. The mower as set forth in claim 1 further including another wing section pivotally mounted to the central section and including:
  (i) another wing deck;
  (ii) a third hydraulic motor mounted adjacent the another wing deck; and,
  (iii) a third cutting blade mounted below the another wing deck and operatively connected with the third hydraulic motor to be driven thereby;
the first and second hydraulic motors being connected in series with the first path and the third hydraulic motor being connected in series with the tubular channel member second path.

3. The mower as set forth in claim 2 further including a first wing tubular member connected by spacing means above the first wing deck, the first wing tubular member providing structural support for the wing and being fluidically connected between the first and second hydraulic motors and the central section tubular members first path for functioning as a heat exchanger to cool the hydraulic fluid and, a second wing tubular member connected by a spacing means above the another wing deck, the second wing tubular member providing structural support for the another wing section and being fluidically connected between the third motor and the central section tubular members' second path to function as a heat exchanger to cool the hydraulic fluid.

4. The mower as set forth in claim 3 wherein the first and second side tubular channel members each include a pair of side tubular channel members, the first path including three of the side tubular channel members and the second path including one of the side tubular channel members.

5. The mower as set forth in claim 1 further including a first wing tubular member connected by spacing means above the wing deck, the first wing tubular member providing structural support for the wing and being fluidically connected between the second motor and the central exchange section tubular members for functioning as a heat exchanger to cool the hydraulic fluid.

6. The mower as set forth in claim 2 wherein the hydraulic system further includes a first control valve for controlling the flow of hydraulic fluid to the first and second hydraulic motors and a second control valve for controlling the flow of hydraulic fluid to the third hydraulic motor, the first and second control valves including a recirculation port which is adapted to return a portion of the hydraulic fluid to the tubular members.

7. The mower as set forth in claim 6 wherein the hydraulic system further includes a reservoir fluidically disposed between the tubular members and the pump.

8. The mower as set forth in claim 1 further including a wing angular position controlling means for controlling the angular position of the wing section relative to the central section.

9. The mower as set forth in claim 8 further including ground clearance adjusting means operatively connected with the central section supporting means for selectively adjusting the altitude of the central section above the ground.

10. A trailing wing mower comprising:
a. a central rotary mower section including:
  (i) a plurality of structurally and fluidically connected tubular members for functioning as a frame and heat exchanger;
  (ii) a central section deck;
  (iii) spacing means for fixedly connecting the central section deck to, below and spaced from the tubular members and thereby forming a structural supportive intersection between said deck and said tubular members such that the passage of air between the tubular members an the central section deck is substantially uninhibited, whereby cooling air is able to flow around the tubular members to facilitate the exchange of heat;
  (iv) a first hydraulic motor mounted adjacent the central section deck;
  (v) a cutting blade mounted below the central section deck and operatively connected with the first hydraulic motor to be driven thereby;
  (vi) support means for supporting the central section for movement along the ground;
b. a wing rotary mower section pivotally mounted to the central section and including;
  (i) a wing deck pivotally connected with the central section deck by a hinge,
  (ii) a second hydraulic motor mounted adjacent the wing deck;
  (iii) a second cutting blade mounted below the wing deck and operatively connected with the second hydraulic motor to be driven thereby;
c. a wing angular position controlling means for controlling the angular position of the wing section relative to the central section, the wing angular position controlling means including:
  (i) a cylinder link pivotally connected adjacent one end with the central section,
  (ii) a fluid cylinder pivotally mounted adjacent one end to the central section and pivotally connected adjacent its other end with the cylinder link, (iii) a wing link pivotally connected adjacent one end with the cylinder link and pivotally connected adjacent its other end with the wing section; and,
d. a hydraulic system including;
  (i) a pump means operatively connected with the first and second hydraulic motors and with the tubular members for pumping hydraulic fluid to the hydraulic motors,
  (ii) return line means for returning hydraulic fluid from the hydraulic motors to the tubular members,
  (iii) means for selectively supplying hydraulic fluid under pressure to the fluid cylinder for selectively controlling extension and contraction of the cylinder to control the angular position of the wing section.

11. A trailing wing mower comprising:
a. a central rotary mower section including:
  (i) a central section deck;
  (ii) a combined frame and heat exchanger including at least first and second side tubular channel members disposed adjacent opposite sides of the central section deck, front and rear tubular channel members disposed adjacent the front and rear of the central section deck, the first side, the second side, the front, and the rear tubular channel members being structurally and fluidically interconnected;
  (iii) spacing means for fixedly connecting the central section deck to, below and spaced from the tubular members and thereby forming a structural supportive intersection between said deck and said tubular members such that the passage of air between the tubular members and the central section deck is substantially uninhibited, whereby cooling air is able to flow around the tubular members to facilitate the exchange of heat;
  (iv) a first hydraulic motor mounted adjacent the central section deck;
  (v) a cutting blade mounted below the central section deck and operatively connected with the first hydraulic motor to be driven thereby;
  (vi) support means for supporting the central section for movement along the ground;
b. a wing rotary mower section pivotally mounted to the central section and including:
  (i) a first wing deck;
  (ii) a second hydraulic motor mounted adjacent the wing deck;
  (iii) a second cutting blade mounted below the first wing deck and operatively connected with the second hydraulic motor to be driven thereby; and
c. a hydraulic system including:
  (i) pump means operatively connected with the first and second hydraulic motors and with the tubular members for pumping hydraulic fluid to the hydraulic motors;
  (ii) return line means for returning hydraulic fluid from the hydraulic motors to the first and second paths of the tubular members.

12. The mower as set forth in claim 11 further including a first wing tubular member connected by spacing means above the wing deck, the first wing tubular member providing structural support for the wing and being fluidically connected between the second motor and the central section tubular members for functioning as a heat exchanger to cool the hydraulic fluid.

13. The mower as set forth in claim 11 further including another wing section pivotally mounted to the central section and including:
  (i) another wing deck;
  (ii) a third hydraulic motor mounted adjacent the another wing deck; and
  (iii) a third cutting blade mounted below the another wing deck and operatively connected with the third hydraulic motor to be driven thereby.

14. The mower as set forth in claim 13 further including a first wing tubular member connected by spacing means above the first wing deck, the first wing tubular member providing structural support for the wing and being fluidically connected between the first wing tubular member providing structural support for the wing and being fluidically connected between the first and second hydraulic motors and the central section tubular members for functioning as a heat exchanger to cool the hydraulic fluid and, a second wing tubular member connected by spacing means above the another wing deck, the second wing tubular member providing structural support for the another wing section and being fluidically connected between the third motor and the central section tubular members to function as a heat exchanger to cool the hydraulic fluid.

* * * * *